United States Patent [19]

Taki et al.

[11] 4,428,621
[45] Jan. 31, 1984

[54] COMBINED PARKING AND SERVICE BRAKE SYSTEM

[75] Inventors: Hiroyuki Taki, Komatsu; Hidenori Mizuguchi, Kanazawa; Hiroshi Ota, Komatsu, all of Japan

[73] Assignee: Kabushiki Kaisha Komatsu Seisakusho, Tokyo, Japan

[21] Appl. No.: 335,766

[22] Filed: Dec. 30, 1981

[51] Int. Cl.³ .............................................. B60T 11/18
[52] U.S. Cl. ........................................ 303/13; 303/2
[58] Field of Search ................. 303/2, 6 A, 9, 10, 13, 303/52, 85

[56] References Cited

U.S. PATENT DOCUMENTS 3,802,746  4/1974  Walser .
4,003,605  1/1977  Fannin ............................... 303/13 X
4,293,164  10/1981  Hoefer et al. ......................... 303/13

*Primary Examiner*—Duane A. Reger
*Attorney, Agent, or Firm*—Armstrong, Nikaido, Marmelstein & Kubovcik

[57] ABSTRACT

A system suitable for positively holding an earthmover in a fixed position during excavating or loading operation, comprising a first air reservoir in communication with a parking brake via a parking control valve. A second air reservoir communicates with front and rear wheel brake cylinders via a dual brake control valve assembly and pneumatic-to-hydraulic converters. A pilot-operated source selector valve coacts with shuttle valves to normally allow communication between the brake control valve assembly and the converters and, upon application of the parking brake by the parking control valve, to place the first air reservoir in communication with the converters. Thus the actuation of the parking control valve results in the application of not only the parking brake but also the service brakes. Interposed between the converters and the brake cylinders, pilot-operated brake locking valves also respond to the actuation of the parking control valve for holding the service brakes applied by permitting fluid flow only in a direction from the converters to the brake cylinders.

9 Claims, 1 Drawing Figure

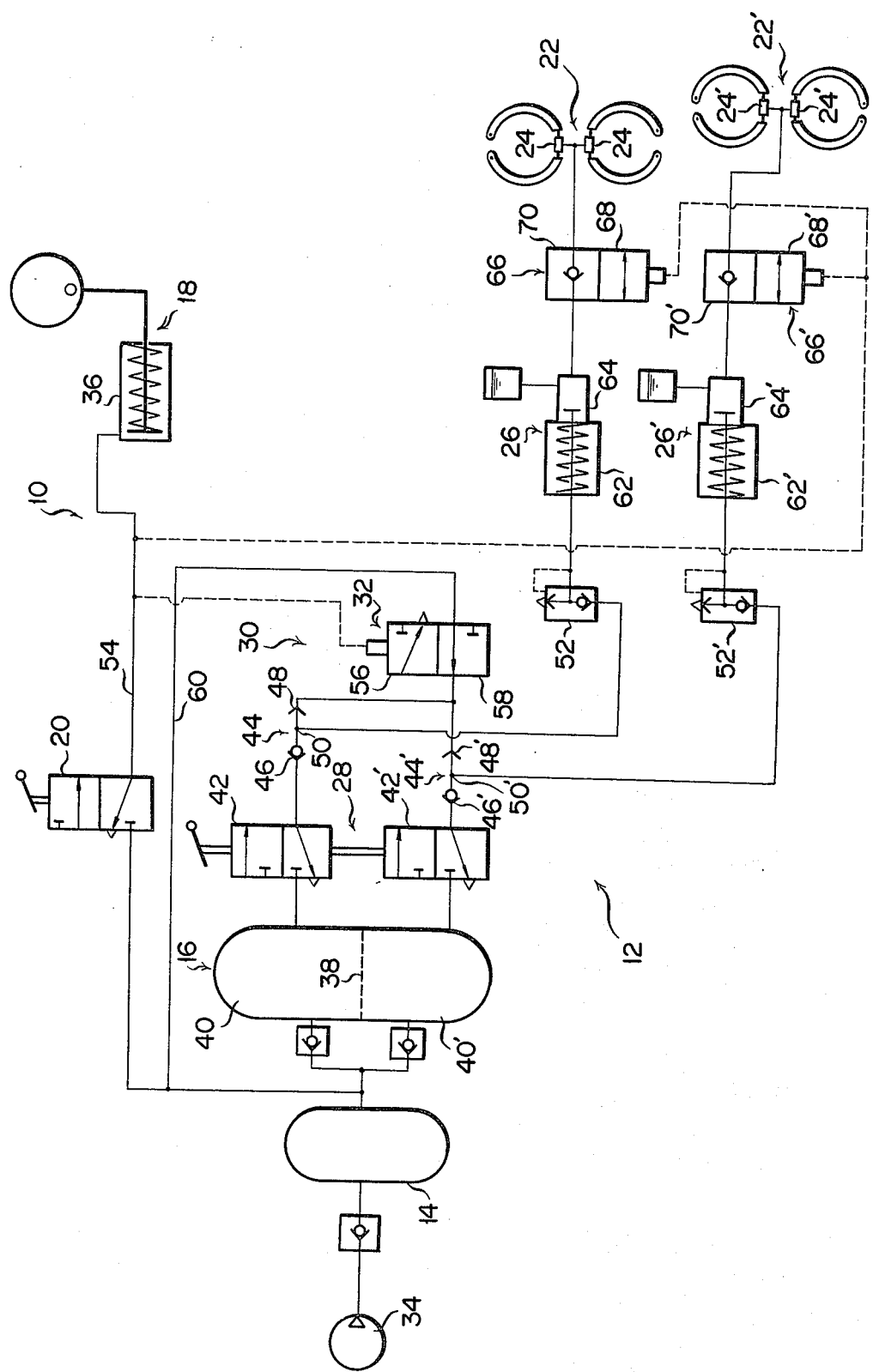

COMBINED PARKING AND SERVICE BRAKE SYSTEM

BACKGROUND OF THE INVENTION

This invention pertains to a vehicular parking system in operative combination with a service brake system for positively holding a stopped vehicle in a stationary position. The combined parking and service brake system according to the invention has particular utility in conjunction with earthmovers such as those equipped with a bucket or like implement assembly.

The first and foremost requirement of the parking system in earthmovers of the type in question is the capability of firmly holding the vehicle stationary during excavating, loading and similar operations, in spite of great reactive forces exerted on the vehicle via the implement assembly. Some such vehicles incorporate an "air over" or air-assisted hydraulic brake system, in combination with a negative brake mechanism on the propeller shaft as a parking brake. This known parking system is insufficient for positively holding the vehicle in a fixed positon during earthmoving operations. Even if the propeller shaft is braked, the axle shafts coupled thereto via a differential tend to rotate by the noted reactive forces.

The most practical solution to the problem is to apply not only the parking brake but also the service brakes for immobilizing the vehicle during earthmoving operations. In carrying this solution into practice, moreover, it is desired that both parking and service brakes be readily applied and released by manipulation of a single control means.

SUMMARY OF THE INVENTION

In consideration of the foregoing the present invention aims at the provision of an integrated parking and service brake system embodying the above solution. Included are two sources of fluid under pressure, one of which communicates with fluid-actuated parking brake means via a parking control valve, the parking brake means being applied and released by the parking control valve. The other pressurized fluid source is placed in and out of communication with fluid-actuated service brake means by service brake control valve means for applying and releasing the service brake means. Also included are source selector means which normally allow communication between the service brake control valve means and the service brake means, permitting the former to apply and release the latter in the usual manner. The source selector means respond to the actuation of the parking control valve for placing the first pressurized fluid source in communication with the service brake means upon application of the parking brake means. Thus, upon actuation of the parking control valve, not only the parking brake means but also the service brake means are applied for positively holding the vehicle immobile against high reactive forces that may be exerted thereon from its implement assembly. It will also be appreciated that a simple manipulation of the parking control valve suffices for simultaneous application and release of both the parking and the service brake means.

Preferably the combined parking and service brake system of this invention further comprises brake locking means for holding the service brake means applied during the application of the parking brake means. The brake locking means function to allow fluid flow only in a direction from the first source to the service brake means, preventing flow in the opposite direction, during the application of the parking and service brake means. The vehicle can thus be retained in a fixed position still more positively.

The above and other features and advantages of this invention and the manner of attaining them will become more apparent, and the invention itself will best be understood, from a study of the following description of a preferred embodiment illustrated in the attached drawing.

BRIEF DESCRIPTION OF THE DRAWING

The drawing is a schematic illustration of an air parking system combined with an air-assisted hydraulic brake system to embody the principles of this invention, the combined parking and service brake system being shown in a state upon application of the parking brake.

DESCRIPTION OF THE PREFERRED EMBODIMENT

The drawing illustrates a parking system 10 in working combination with a dual service brake system 12, for use in a vehicle such as an earthmover. The combined parking and service brake system broadly comprises:

1. First 14 and second 16 sources of compressed air.
2. A parking brake assembly 18 of the prior art design.
3. A parking control valve 20 for the control of air communication between the first compressed air source 14 and the parking brake assembly 18.
4. Front 22 and rear 22' service brake assemblies of the well known type including wheel cylinders 24 and 24'.
5. Front 26 and rear 26' pneumatic-to-hydraulic converters for converting incoming air pressures into equivalent hydraulic pressures for actuation of the service brake wheel cylinders 24 and 24'.
6. A dual service brake control valve assembly 28 for applying and releasing the service brake assemblies 22 and 22' by controlling air communication between the second compressed air source 16 and the pneumatic-to-hydraulic converters 26 and 26'.
7. Source selector means 30 including a source selector valve 32 for normally allowing communication between the dual service brake control valve assembly 28 and the pneumatic-to-hydraulic converters 26 and 26' and, upon application of the parking brake assembly 18, placing the first compressed air source 14 in communication with the converters 26 and 26' to cause application of the service brake assemblies 22 and 22'.

In the illustrated embodiment the first 14 and second 16 compressed air sources take the form of air reservoirs. The first air reservoir 14 is in direct communication with an air compressor 34, and the second air reservoir 16 in direct communication with the first 14.

To make up the parking system 10 the first air reservoir 14 communicates with an air cylinder 36 of the parking brake assembly 18 via the parking control valve 20. The air cylinder 36 is of the single-acting, spring-return type, normally receiving the compressed air from the first air reservoir 14 to hold the parking brake released. Actuated manually, the parking control valve 20 makes on-off control of communication between first air reservoir 14 and air cylinder 36. In the drawing the parking control valve is shown actuated to communicate the air cylinder 36 with atmosphere and hence to apply the parking brake.

The second air reservoir 16 serves as the fluid source of the dual service brake system 12. A partition 38 bisects the interior of this second air reservoir into first 40 and second 40' halves for separately supplying compressed air to the front and rear service brake systems. The dual service brake control valve assembly 28 comprises front 42 and rear 42' control valves of identical design, interconnected for simultaneous actuation by the vehicle operator. The front service brake control valve 42 makes on-off control of air communication between first reservoir half 40 and front pneumatic-to-hydraulic converter 26. The rear service brake control valve 42' likewise makes on-off control of air communication between second reservoir half 40' and rear pneumatic-to-hydraulic converter 26'.

Disposed just downstream of the front service brake control valve 42 is a shuttle valve 44 which has a first inlet port 46 in communication with the front service brake control valve, a second inlet port 48 in communication with the pilot-operated source selector valve 32, and an outlet port 50 in communication with the front pneumatic-to-hydraulic converter 26 via a quick release valve 52. Another shuttle valve 44' has a first inlet port 46' in communication with the rear service brake control valve 42', a second inlet port 48' in communication with the source selector valve 32, and an outlet port 50' in communication with the rear pneumatic-to-hydraulic converter 26' via a quick release valve 52'.

The source selector valve 32 and the two shuttle valves 44 and 44' constitute in combination the noted source selector means 30 for selectively placing the pneumatic-to-hydraulic converters 26 and 26' either with the second air reservoir 16 via the dual service brake control valve assembly 28 or with the first air reservoir 14. Pilot operated from a conduit 54 extending between parking control valve 20 and parking air cylinder 36, the source selector valve 32 shifts between first 56 and second 58 positions. In the first position 56 the valve 32 communicates the second inlet ports 48 and 48' of the shuttle valves 44 and 44' with atomophere. In the second position 58, on the other hand, the source selector valve communicates the shuttle valve second inlet ports with the first air reservoir 14 by way of a conduit 60 bypassing the second air reservoir 16 and dual service brake control valve assembly 28. The source selector valve is normally held in the first position 56 and shifts to the second position 58 upon application of the parking control valve 20 to apply the parking brake.

The front pneumatic-to-hydraulic converter 26 comprises an air cylinder 62 of the single-acting, spring-return type and a hydraulic brake master cylinder 64, operatively interconnected to translate incoming air pressure into equivalent hydraulic pressure. The rear pneumatic-to-hydraulic converter 26' likewise comprises an air cylinder 62' and a brake master cylinder 64', also interconnected for the same purpose as the front converter 26. The front 64 and rear 64' brake master cylinders communicate with the front 24 and rear 24' wheel cylinders of the service brake assemblies 22 and 22', respectively.

Interposed between the front 64 and rear 64' brake master cylinders and the front 24 and rear 24' wheel cylinders are front 66 and rear 66' brake locking valves, respectively, for locking the service brake assemblies 22 and 22' in the applied condition during the application of the parking brake assembly 18. Each brake locking valve 66, 66' shifts between first 68, 68' and second 70, 70' positions by being pilot operated from the conduit 54 extending between parking control valve 20 and parking air cylinder 36. In the first position 68, 68' each brake locking valve 66, 66' allows bidirectional fluid flow between brake master cylinder 64, 64' and wheel cylinders 24, 24'. In the second position 70, 70', on the other hand, the brake locking valve permits fluid flow only from brake master cylinder to wheel cylinders. Both brake locking valves 66 and 66' are normally held in the first position 68, 68' and shift to the second position 70, 70' upon actuation of the parking control valve 20 to apply the parking brake.

In operation, as the air compressor 34 is set into operation, the compressed air is delivered to and stored in the first air reservoir 14 and thence in the second air reservoir 16. The vehicle operator may manually actuate the dual service brake control valve assembly 28 to apply and release the front 22 and rear 22' service brake assemblies in the usual manner. Upon actuation of the valve assembly 28 in a braking direction, for example, the compressed air from the halves 40 and 40' of the second air reservoir 16 passes through the valves 42 and 42' on to the shuttle valves 44 and 44'. Since now the parking brake is assumed to be unapplied, the shuttle valves admit the compressed air through their first inlet ports 46 and 46', for delivery to the air cylinders 62 and 62' of the pneumatic-to-hydraulic converters 26 and 26'. The brake master cylinder 64 and 64' respond to the air pressures by putting out equivalent hydraulic pressures for actuation of the wheel cylinders 24 and 24' of the front 22 and rear 22' service brake assemblies. Thus is the vehicle retarded or stopped. The brake locking valves 66 and 66' are now assumed to be both in their first position 68, 68'.

For holding the stopped vehicle stationary, as for earth-moving operation, the vehicle operator may actuate the parking control valve 20 to the illustrated position. Upon consequent withdrawal of the compressed air from the air cylinder 36, the parking brake assembly 18 acts on the vehicle propeller shaft by the force of the spring in the air cylinder, thereby braking the vehicle in the known manner. The pressure reduction in the conduit 54 between parking control valve 20 and parking cylinder 36 results in the shifting of the source selector valve 32 to the second position 58, and of the brake locking valves 66 and 66' to the second position 70, 70', as shown. The source selector valve 32 when shifted to the second position 58 directs the compressed air from the first air reservoir 14 toward the shuttle valves 44 and 44'. From these shuttle valves the compressed air travels through the quick release valves 52 and 52' into the air cylinders 62 and 62' of the pneumatic-to-hydraulic converters 26 and 26', thereby to be converted into equivalent hydraulic pressures.

The hydraulic pressures generated by the master cylinders 64 and 64' of the converters 26 and 26' pass the brake locking valves 66 and 66' and enter the wheel cylinders 24 and 24' for applying the front 22 and rear 22' service brakes. The vehicle is now positively locked against movement both by the parking brake and by the service brakes. Moreover, since the brake locking valves 66 and 66' are now in their second position 70, 70', the fluid pressures in the wheel cylinders 24 and 24' cannot possibly escape therefrom, thus holding the service brakes applied in spite of the great reactive forces the vehicle may experience from its implement assembly.

For releasing the vehicle the operator may actuate the parking control valve 20 to the position for establishing communication between first air reservoir 14 and parking cylinder 36. The parking brake is now released, and so are the service brakes as the pilot-operated source selector valve and brake locking valves 66 and 66′ both return to their first positions 56 and 68, 68′. Thus, according to this invention, the activation of only the parking control valve 20 results in the simultaneous application and release of both parking and service brakes.

While it will be apparent that the preferred embodiment of the invention herein disclosed is well calculated to accomplish the objectives of the invention, it is recognized that the combined parking and service brake system according to the invention is subject to variations or modifications depending upon the particular type of vehicle in which it is to be incorporated. The invention should therefore be construed broadly and in a manner consistent with the proper scope or fair meaning of the subjoined claims.

What is claimed is:

1. A combined parking and service brake system capable of positively holding a stopped vehicle in a stationary position, comprising:
   (a) first and second sources of fluid under pressure;
   (b) fluid-actuated parking brake means;
   (c) a parking control valve for controlling fluid communication between the first pressurized fluid source and the parking brake means, the parking brake means being applied and released by the parking control valve;
   (d) fluid-actuated service brake means;
   (e) service brake control valve means for applying and releasing the service brake means by controlling fluid communication thereof with the second pressurized fluid source; and
   (f) source selector means for normally allowing communication between the service brake control valve means and the service brake means, the source selector means being responsive to the actuation of the parking control valve for placing the first pressurized fluid source in communication with the service brake means upon application of the parking brake means;
   (g) whereby both the parking brake means and the service brake means are applied upon actuation of the parking control valve.

2. The combined parking and service brake system as recited in claim 1, further comprising brake locking means responsive to the actuation of the parking control valve for holding the service brake means applied during the application of the parking brake means by permitting the flow of the pressurized fluid only from the first source to the service brake means.

3. The combined parking and service brake system as recited in claim 2, wherein the service brake means comprises:
   (a) brake assemblies including wheel cylinders; and
   (b) at least one master cylinder for actuating the wheel cylinders in response to the pressurized fluid from the first or second source.

4. The combined parking and service brake system as recited in claim 3, wherein the brake locking means comprises:
   (a) a pilot-operated brake locking valve interposed between the master cylinder and the wheel cylinders for controlling fluid communication therebetween in response to the fluid pressure between the parking brake means and the parking control valve.

5. The combined parking and service brake system as recited in claim 1, wherein the source selector means comprises:
   (a) a pilot-operated source selector valve for allowing the passage therethrough of the pressurized fluid from the first source upon application of the parking brake means; and
   (b) a shuttle valve having a first inlet port in communication with the service brake control valve means, a second inlet port in communication with the source selector valve, and an outlet port in communication with the service brake means.

6. A combined parking and service brake system for an earthmover or the like, comprising:
   (a) first and second sources of compressed air;
   (b) air-operated parking brake means;
   (c) a parking control valve for controlling communication between the first compressed air source and the parking brake means, the parking brake means being normally held released under air pressure from the first source and being applied upon discommunication therefrom by the parking control valve;
   (d) hydraulic fluid-actuated service brake means;
   (e) pneumatic-to-hydraulic converter means for converting incoming air pressure to equivalent hydraulic pressure for actuation of the service brake means;
   (f) service brake control valve means for applying and releasing the service brake means by controlling communication between the second compressed air source and the pneumatic-to-hydraulic converter means;
   (g) source selector means for normally allowing communication between the service brake control valve means and the pneumatic-to-hydraulic converter means, the source selector means being responsive to the actuation of the parking control valve for placing the first compressed air source with the pneumatic-to-hydraulic converter means upon application of the parking brake means; and
   (h) brake locking means for holding the service brake means applied during the application of the parking brake means.

7. The combined parking and service brake system as recited in claim 6, wherein the source selector means comprises:
   (a) a pilot-operated source selector valve for allowing the passage therethrough of the compressed air from the first source upon application of the parking brake means; and
   (b) a shuttle valve having a first inlet port in communication with the service brake control valve means, a second inlet in communication with the source selector valve, and an outlet port in communication with the pneumatic-to-hydraulic converter means.

8. The combined parking and service brake system as recited in claim 6, wherein the brake locking means comprises:
   (a) a pilot-operated brake locking valve interposed between the pneumatic-to-hydraulic converter means and the service brake means, the brake locking valve being responsive to the actuation of the parking control valve for permitting the flow of the pressurized hydraulic fluid only from the pneumatic-to-hydraulic converter to the service brake means during the application of the parking brake means.

9. The combined parking and service brake system as recited in claim 6, which further comprises an air compressor, wherein the first compressed air source is a first air reservoir in direct communication with the air compressor, and wherein the second compressed air source is a second air reservoir in direct communication with the first air reservoir.

* * * * *